United States Patent [19]
Rood et al.

[11] 3,981,654
[45] Sept. 21, 1976

[54] APPARATUS FOR PRODUCING FIBER REINFORCED ORGANIC FOAM

[75] Inventors: Leonard D. Rood, Columbus; Ronald E. Kissell, Alexandria, both of Ohio

[73] Assignee: Owens-Corning Fiberglas Corporation, Toledo, Ohio

[22] Filed: Nov. 13, 1974

[21] Appl. No.: 523,383

Related U.S. Application Data

[62] Division of Ser. No. 338,486, March 6, 1973, Pat. No. 3,867,494.

[52] U.S. Cl. ............................... 425/115; 425/224; 425/817 C
[51] Int. Cl.² ......................................... B29D 27/04
[58] Field of Search ............... 156/78, 79; 264/45.4, 264/46.2, 46.3, 45.3; 425/4 C, 817 C, 115, 224, 329

[56] References Cited
UNITED STATES PATENTS

| | | | |
|---|---|---|---|
| 2,648,619 | 8/1953 | Alderfer | 264/46.3 X |
| 2,698,271 | 12/1954 | Clark | 425/115 X |
| 2,841,205 | 7/1958 | Bird | 425/115 X |
| 3,109,763 | 11/1963 | Finger | 425/115 X |
| 3,226,458 | 12/1965 | Graff et al. | 425/115 X |
| 3,240,846 | 3/1966 | Voelker | 425/115 X |
| 3,537,929 | 11/1970 | keith et al. | 425/115 X |
| 3,553,300 | 1/1971 | Buff | 425/4 C X |
| 3,860,371 | 1/1975 | Willy | 264/45.3 |

FOREIGN PATENTS OR APPLICATIONS

| | | | |
|---|---|---|---|
| 315,247 | 9/1956 | Switzerland | 425/115 |

*Primary Examiner*—J. Howard Flint, Jr.
*Assistant Examiner*—Mark Rosenbaum
*Attorney, Agent, or Firm*—John W. Overman; Allen D. Gutchess, Jr.

[57] ABSTRACT

Urethane plastic foam reinforced with glass fibers is provided, the glass fibers being combined with the plastic foam material prior to foaming. The foaming of the plastic material is physically controlled and restrained to achieve particular desired physical characteristics of the final product. By restricting the extent of foaming, and by using particular layers of fibers, high fiber concentration and more dense skin areas can be obtained in the foam; the fibers can also be initially distributed in a manner to increase their concentration near the surfaces of the foam body. Apparatus is provided for producing reinforced foam in a continuous manner and a method is also provided for combining the fiber reinforcement and the foamable plastic material in a manner such that the plastic material is disposed between two layers of the fiber reinforcement to assure proper distribution of the fibers in the foam. In a preferred form, the fibers are initially disposed in the foamable material in a manner to lie generally perpendicular to the primary direction of growth or rise of the foamable material so that the fibers are also generally perpendicular to the resulting elongate cells. The fibers also preferably are of particular lengths and diameters and present in optimum concentrations to achieve maximum reinforcement and strength in the final product.

5 Claims, 13 Drawing Figures

APPARATUS FOR PRODUCING FIBER REINFORCED ORGANIC FOAM

This is a division of application Ser. No. 338,486, filed Mar. 6, 1973, now U.S. Pat. No. 3,867,494.

This invention relates to combinations of organic foams reinforced with glass fibers.

Plastic foams, such as urethanes, have many uses and are continually finding more. While such foams have many advantages and beneficial characteristics, they also tend to lack strength and dimensional stability.

In accordance with the present invention, glass fibers are combined with plastic foams to overcome the above deficiencies and improve the physical characteristics of the foam. Apparatus is provided for continuously making slabs or bodies of reinforced plastic foam. In one form, the foamable plastic material is supplied in a liquid state between two layers of glass fibers which can be continuously provided from supply rolls. The foamable material can be supplied from a line which is reciprocated back and forth substantially over the width of the fibrous layers. Cover sheets are also preferably located on the outer surfaces of the fibrous layers to protect components of the machine from contamination from the foam material as it penetrates into the fibrous layers and foams to the outer surfaces thereof. To aid in the distribution of the foamable material in the fibrous layers, the combination is maintained in a restricted zone under some compression during initial foaming until substantially all of the fiber layers have been impregnated with the foamable liquid in its cream or initially foamed state. As the foamable material subsequently foams, the combination is directed between a pair of spaced conveyor belts which preferably are positioned apart a distance less than the thickness the combination of foam and fibers would otherwise ordinarily reach if allowed to foam unrestrictedly. In this manner, the resulting fiber reinforced foam body or slab has two major, flat, parallel surfaces in its final form. The product can be cut to any desired size after it emerges from the conveyor belts and the plastic material is sufficiently hard.

The fibers are generally oriented in directions parallel to the major surfaces of the layers while the foam material foams or rises in directions perpendicular to the major surfaces. It has been discovered that optimum properties are obtained when the cells of the foamed material are elongate in the direction of rise or in a direction perpendicular to the major surfaces of the final slab, the foam being stronger in this direction and weaker in directions parallel to the major surfaces. With the fibers disposed generally perpendicular to the elongation of the cells and parallel to the major surfaces of the slab, they provide the additional strength exactly where it is needed, in directions parallel to the major surfaces of the slab. It has also been found that employing fibers of particular diameters and longer lengths improves the strength of the foam. This occurs because the fibers tend to lie along the walls of the cells of the foam and provide better reinforcement than when shorter fibers are used which tend to pierce the cell walls and extend through the cells.

Also in accordance with the invention, a foam product can be made with the reinforcing fibers concentrated near the skins thereof. When the foam material foams, and moves outwardly toward the surfaces, it also tends to move the fibers in that direction if the fibers are close enough together. By maintaining the maximum distance between the major surfaces of the slab substantially less than would otherwise occur with unrestricted foaming, the fibers also are moved outwardly and concentrated more near the surfaces. This provides greater impact resistance and compressive strength for the resulting slab or body than would otherwise occur. If desired, the fibrous layers used with the foam can initially be supplied so that the fibers are concentrated near the outer surfaces of these layers also to achieve concentration of the reinforcing fibers near the surfaces or skins of the slabs.

A foam product with greater compressive or impact strength at the surfaces can also be achieved by using fibrous mats at the surfaces in addition to the main layer or layers of fiber reinforcement in the interior.

It is, therefore, a principal object of the invention is to provide improved apparatus for continuously making fiber-reinforced foam bodies.

Many other objects and advantages of the invention will be apparent from the following detailed description of preferred embodiments thereof, reference being made to the accompanying drawings, in which:

FIGS. 12 and 13 are schematic views of modified apparatus for applying compressive forces to the newly-combined foam and fiber combination.

Figure 1:
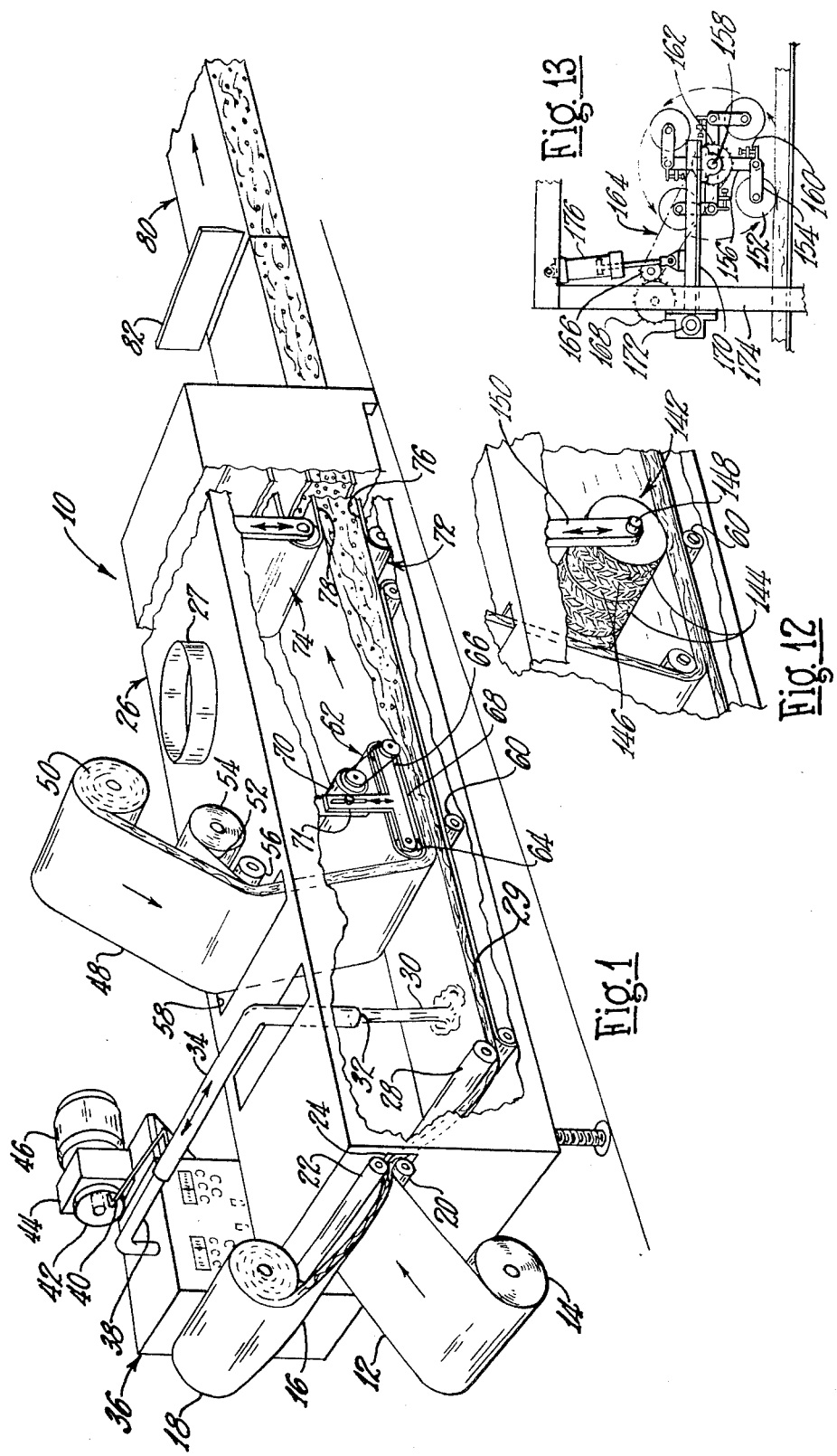
FIG. 1 is a somewhat schematic view in perspective, with parts broken away, of a line or apparatus for continuously producing a fiber-reinforced foam body or slab.

Referring to the drawings, and particularly to FIG. 1, a line indicated at 10 is suitable for continuously producing a fiber-reinforced foam body. A flexible carrier or protective sheet 12 is supplied through the line 10 from a supply roll 14. The sheet 12 can be of paper or other inexpensive material and serves to carry the composite body and to protect components of the line 10 from contamination by the foam. The sheet can also form part of the final product if desired. A lower layer 16 of fibers is also supplied to the line 10 from a supply roll 18. The fibrous layer 16 is located above the lower sheet 12 with both supplied between suitable rolls 20 and 22 located adjacent an opening 24 in an exhaust hood 26. A slight negative pressure is maintained within the exhaust hood 26 by an exhaust fan (not shown) communicating with an outlet 27 in the top of the exhaust hood.

The sheet 12 and the layer 16 are directed under a guide roll 28 and onto a belt 29 with an organic foamable material 30 then applied to the upper or inner surface of the layer 16. This material is supplied through a discharge end 32 of a supply pipe 34 from a suitable source of supply indicated at 36 in which the ingredients or components for the foamable material 30 can be proportioned and mixed. The components for the foamable material can be supplied in two portions, one being an isocyanate and the other being a polyol consisting of a base resin, an emulsifier, a catalyst, and a blowing agent, such as Freon 11B. These two basic portions are combined in proper proportions at the supply source 36 and immediately fed through a stationary pipe 38 communicating with the pipe 34. The pipe 34 is reciprocated transversely of the layer 16 to supply the foamable material 30 uniformly thereacross, either as a stream, as shown, or as a spray. For this purpose the reciprocated pipe 34 is slidably mounted on the stationary pipe 38 and moved by a link 40 which is pivotally connected to a cam 42 driven by a speed reducer 44 and a suitable motor 46. The foamable material 30 preferably is not supplied completely to the edges of the layer 16, however, since the material will expand outwardly to some extent as it foams.

After the foamable material 30 is supplied in the liquid state on the fibrous layer 16, a second fibrous layer 48 can be applied thereover from a supply roll 50. It is not always essential to provide a second fibrous layer but the foam can more readily and uniformly penetrate the fibrous layer if it is in the form of two thinner layers than one thicker one. When the fibrous layer exceeds a thickness of about four inches, the use of two thinner layers has been found to be advantageous. An upper carrier sheet 52, which can also be a flexible, inexpensive, and disposable material such as paper, is applied to the outer or upper surface of the fibrous layer 48 from a supply roll 54. The fibrous layer 48 and the sheet 52 are directed around a guide roll 56 through an elongate opening 58 in the exhaust hood 26 and into contact with the foamable liquid 30 and the first layer 16.

To achieve thorough penetration of the foamable liquid in the fibrous layers, a combination of the carrier sheet 12, the fibrous layer 16, the foamable liquid 30, the fibrous layer 48, and the upper sheet 52 are directed between a lower supporting roll 60 and an upper conveyor 62. The conveyor 62 and the supporting roll 60 are positioned along the line 10 such that the foamable liquid 30 reaches the cream state substantially at the time the foamable material and fibrous layers reach the supporting roll and the conveyor. The conveyor 62 includes a first or forward roller 64 and a second or downstream roller 66 on which a belt 68 is supported, with the roll 66 preferably being driven by a suitable drive 70. The rolls 64 and 66 are also adjustably mounted for vertical movement and for varying pressure by mounting means 71. The distance between the main conveyor belt 29 and the pressure belt 68 as measured at the beginning of the conveyor 62 preferably is such as to compress the fibrous layers 16 and 48 to some degree but not excessively. For example, a four inch layer might be compressed to a thickness of about one inch. Stated another way, a fibrous layer or pack with foamable material therein reaching the cream state can be compressed to about one-fourth its original volume. If the compressive forces are excessive, the fiber concentration will be too great and the foamable material will collapse. In some instances, the fibrous layer need not be compressed at all but only retained in shape while the foamable material foams.

The foamable material begins to foam or expand substantially at the time it reaches its cream state or shortly thereafter. The blowing agent or freon evolves at this time because of polymerization and the heat internally built up in the foamable material. The compression on or the retention of the fibrous layers during this initial foaming aids in enabling the layers to be thoroughly impregnated by the foamable liquid. By placing the second conveyor roller 66 a longer distance from the main conveyor belt 29 so that the belt 68 diverges from the belt 29, the impregnated fibrous pack is allowed to expand as foaming progresses. The foam cells thereby elongate in the direction of rise to provide greater strength in that direction than otherwise obtainable, the strength in the horizontal direction being primarily provided by the fibers which tend to have a horizontal orientation. If elongate cells in a horizontal direction are desired, the second conveyor roller 66 can be located closer to the belt 29 to greatly restrict vertical rise of the foam. This also tends to move the foamable material outwardly toward the edges of the fibrous layers 16 and 48 to a greater extent than otherwise.

The foamable material reaches a stringy state a distance after it moves beyond the conveyor 62. In this state, if the foam is touched by an object and the object is pulled away, the foamable material will form a string or strings therewith. Shortly before the foamable material reaches the stringy state, the combination of the foamable material and fibrous layers is directed between lower and upper belt conveyors 72 and 74 having adjacent belt runs 76 and 78. These are spaced apart a distance less than the thickness the foam would otherwise reach if allowed to expand unrestrictedly. One or both of the belts 72 and 74 also can be driven to move the foam and fibrous layer combination along the line 10. The belts 72 and 74 are of sufficient length that the foam will have progressed through the tack-free state and will have reached its final rise by the time it is discharged from between the runs 76 and 78 of the conveyor. Subsequently, foam slabs or bodies 80 emerge and can be cut to a desired size by a suitable knife or other cutting device 82.

Figure 2:
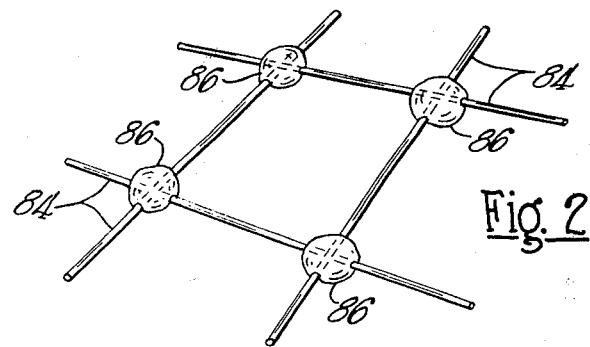
FIG. 2 is a greatly enlarged view in perspective of fibers of a fibrous layer to be impregnated with foamable material.

FIG. 2 shows fibers 84 of the fibrous layers 16 and 48. The fibers are relatively long, having lengths in a range of ¾ inch to 2 inches. A close examination of the reinforced foam bodies indicates that these longer fibers tend to be disposed along the cell walls of the foam, rather than piercing the cell walls and extending through the cells as occurs with shorter fibers. It has also been found that in the final foam product, the glass fibers should be present in an amount of 0.6 – 0.8 pounds pcf. If the amount of fibers exceeds this range, the foam will collapse. Lesser amounts of fibers can also be used, as low as about one-third of the aforesaid amount. With the lesser amounts of fibers, however, the final product will not have fibers concentrated at the surfaces or skins thereof. The fiber diameter is also important in the combination. Relatively coarse fibers are desired for this purpose, in a range of 0.00080 to 0.00300 inch. If fibers of smaller diameter are employed in the desired concentration of 0.6 – 0.8 pounds of fibers per cubic foot of final product, there will be insufficient free area in the fibrous layer or pack for the foam and the foam will collapse.

The fibers 84 in the layer or pack are held together by a binder 86 which tends to be concentrated at the intersections of the fibers 84, FIG. 2. The type of binder used is important so that it will provide a link between the fibers 84 and the foamable material. With urethane plastic foamable material, a urea-based binder is preferred to provide the desired interlock. Binders of an acidic nature are unsuitable since they tend to repel the foamable material.

Figure 3:
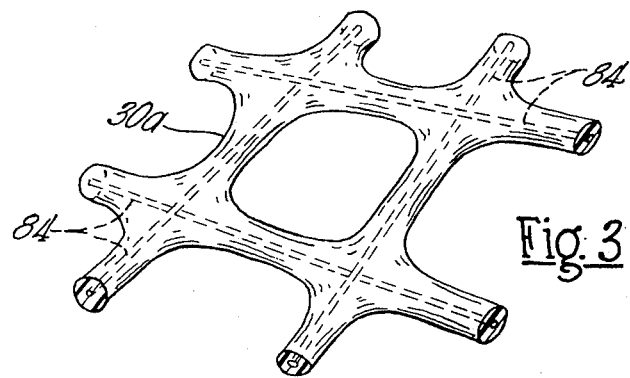
FIG. 3 is a view similar to FIG. 2 of the fibers covered with foamable material in the cream state, prior to foaming.

FIG. 3 shows the fibers 84 with foamable material 30a in the cream state as the combination exists on the line 10 between the main conveyor belt 29 and an upstream portion of the conveyor 62. In this state, the foamable material has penetrated the fibrous pack in the form of the two layers 16 and 48 but has not begun to foam to any extent. At this time, the foamable material exists primarily around the fibers 84, encasing them, as shown.

Figure 4:
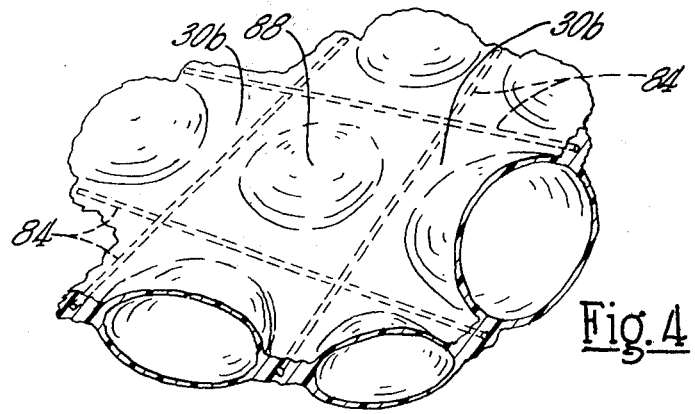
FIG. 4 is a view similar to FIGS. 2 and 3 of the fibers after the foamable material has substantially completed foaming.

FIG. 4 shows the fibers 84 with foamable material 30b shown in a state after substantial foaming has occurred at a location along the line 10 substantially downstream of the conveyor 62. During foaming, the foamable material 30a in the cream state moves outwardly from the fibers 84 to the interstices therebetween to form cells 88 in the interstices with the fibers 84 being primarily in the cell walls and not penetrating the cells. This location of the fibers provides a more closed cell structure which provides better strength and lower vapor permeability.

A representative example of a foam and its various states in relation to the line 10 of FIG. 1 will be set forth for illustrative purposes. A urethane foam reaches the cream state 20 seconds after the components are mixed and foaming of the foamable material begins substantially at this time. The foam reaches a 50 percent rise in 40 seconds and reaches the stringy state after 50 seconds. After 55 seconds the foam becomes tack-free but continues to rise, if unrestricted, until foaming is completed after 70 seconds. Assuming that the conveyor of the line 10 moves the foam and fibrous layer combination at a speed of 12 feet per minute, the first roller 64 of the conveyor 62 will be slightly less than four feet beyond the pour point, the location at which the foamable material 30 is deposited on the layer 16. This distance is slightly under four feet because the cream time is timed from the mixing of the components at the source 36 after which the mixture takes a few seconds to reach the upper surface of the layer 16. In this instance, the conveyor 62 will be about two feet long so that the foam has reached approximately a 25 percent rise by the time it moves beyond the downstream conveyor roller 66. The conveyors 72 and 74 will be about nine feet beyond the pour point and will extend for at least five feet along the line 10 to assure that the foaming is complete by the time the foam body 80 is discharged from between the conveyors 72 and 74.

Figure 5:
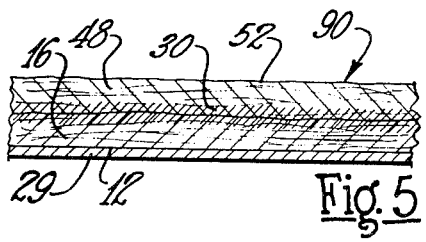
FIG. 5 is a schematic view in vertical cross section taken through two layers of fibers between which a foamable material has been placed.

The combination of foam and fibrous layers is schematically at 90 in FIG. 5 in the state as the combination reaches the conveyor 62. Here, the foamable material 30 has not yet been distributed into the fibrous layers 16 and 48 and foaming has not commenced.

Figure 6:
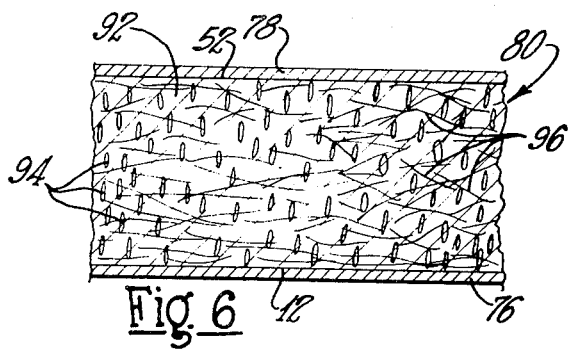
FIG. 6 is a view similar to FIG. 5 of the same components after foaming and with restrictive members limiting the extent of the foaming.

FIG. 6 shows the final fiber-reinforced slab or body 80 shortly before emerging from between the belt runs 76 and 78. A foamed material 92 results after the foamable material 30 has foamed or risen to completely fill the distance between the conveyor runs 76 and 78. With the foam rising primarily in a vertical direction, cells 94 formed in the foam are elongate with their longitudinal or major dimensions extending generally perpendicular to the main surfaces of the slab 80. Fibers indicated at 96 in FIG. 6 of the layers 16 and 48 are oriented generally parallel to the major surfaces of the slab 80. The fibers are so disposed when in the layers 16 and 48 and remain so when the composite is compressed between the conveyor 62 and the belt 29 and also between the conveyor runs 76 and 78. The elongate cells 94 provide substantial strength for the foam slab 80 in the vertical direction but leave the foam weaker in a horizontal direction. Here, however, the weakness is overcome by the fibers 96 which provide horizontal strength for the foam. Consequently, the foam slab 80 no longer exhibits a directional strength or weakness but is strong in all directions. Both compressive and flexural strength are increased by the fiber orientation.

Plastic foam slabs or bodies also tend to exhibit a low impact resistance or compressive strength at the surfaces. To overcome or reduce this tendency, a foam slab or body indicated at 98 in FIG. 7 can be made. In this instance, the slab 92 is made with glass fibers located in layers which have fewer or smaller interstices than the layers 16 and 48. The foamable material thus has less chance to penetrate or pass through the fibrous layers during foaming. Consequently, when the foamable material 30 rises, it tends to carry or push fibers 100 in the layers toward the major surfaces of the slab with a concentration of the fibers 100 thereby resulting near the major surfaces thereof. The central portion of the foamed plastic can have glass fibers in an amount of about 5–15 percent, by weight, with the fiber concentration at the surface or skin portions being 30–50 percent, by weight. This concentration of fibers provides greater impact resistance at the surfaces of the slab and the foam also has a lesser tendency to absorb moisture. The surface concentration of the fibers can also be achieved by using layers of fibers similar to the layers 16 and 48 but with the fibers initially concentrated at the lower surface of the layer 16 and at the upper surface of the layer 48. The denser fibers near the surfaces of the foam slab have a tendency to break down some of the foam cells so that a denser foam also results near the surfaces.

Figure 7:
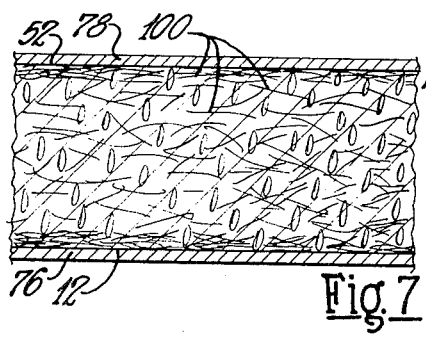
FIG. 7 is a view in vertical cross section similar to FIG. 6 but with the fibers concentrated more at the surfaces or skins of the body.
Figure 8:
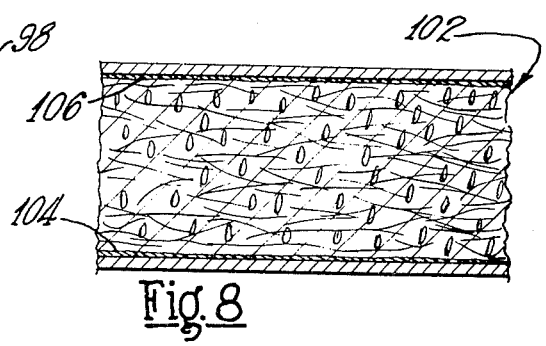
FIG. 8 is a view similar to FIG. 6 but with mats of fibers positioned at the outer surfaces of the body.

A concentration of fibers at the major surfaces of a slab or body can also be achieved in a slab or body 102 of FIG. 8. In this instance, instead of the concentration of the fibers at the surfaces, as shown in FIG. 7, fibrous mats 104 and 106 are employed at the surfaces with these being used, if desired, in place of the flexible sheets 12 and 52. The foam in this case, as it rises, penetrates interstices in the mats 104 and 106 to provide an integral product again having high impact resistance at the surfaces along with the lower water and vapor absorption characteristics. The mats 104 and 106 can be of woven or non-woven fibers, preferably the latter.

Figure 9:
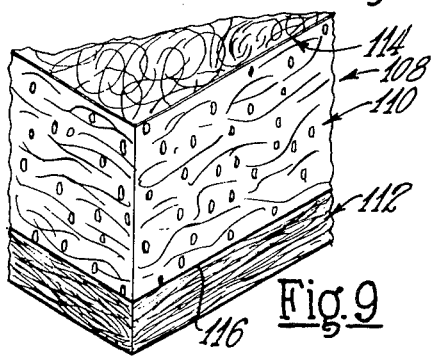
FIG. 9 is a fragmentary view in perspective of roof insulation embodying a fiber-reinforced foam slab in accordance with the invention.

Roof insulation embodying the invention is shown in FIG. 9. Accordingly, insulation indicated at 108 includes a glass fiber-reinforced foam slab 110, a lower glass fiber layer or board 112, and an upper layer or mat 114 of glass fibers. The lower fibrous board 112 provides fire resistance for the insulation 108 while the foam slab 110 provides good thermal insulation. The upper mat 114 provides protection for the plastic foam of the slab 110 when hot asphalt or the like is applied to the upper mat 114. The foam slab 110 can be formed in situ on the board 112 but a coating or layer 116 of latex paint or other suitable material incorporating an inorganic filler is preferably first applied to the board 112. This reduces the extent of penetration of the foamable material into the board 112 which results in waste of the foam. With the coating 116, penetration is still sufficient to provide an excellent bond between the slab 110 and the board 112. The mat 114 can be applied over the foamable material and reinforcing fibers at the time, or before, foaming commences, with the mat 114 taking the place of the paper layer 52, if desired. Penetration of the foamable material into the mat 114 also occurs to provide a good bond which prevents the possibility of the mat being peeled off the foam slab 110 when the hot asphalt is mopped on.

Figure 10:
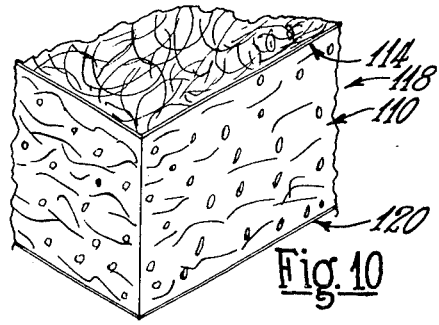
FIG. 10 is a view similar to FIG. 9 of slightly modified roof insulation.

Roof insulation 118 of FIG. 10 is similar to that of FIG. 9 except that a lower mat 120 of glass fibers is substituted for the lower fibrous board 112. The overall insulation of FIG. 10 can thus be thinner than that of FIG. 9 or the foam slab 110 can be thicker. The insulation 118 does not have the fire resistance of the insulation 108 but is used on concrete or structures of similar fireproof, non-conducting material. An effective bond is achieved between the reinforced plastic foam slab 110 and the mats 114 and 120 due in part to the fiber reinforcement of the plastic foam. In some instances, a slab having a skin with concentrated fibers, as shown in FIG. 7, may be used in place of the slab 110 with the upper mat 114 of FIG. 9 or 10 then no longer being needed.

Figure 11:
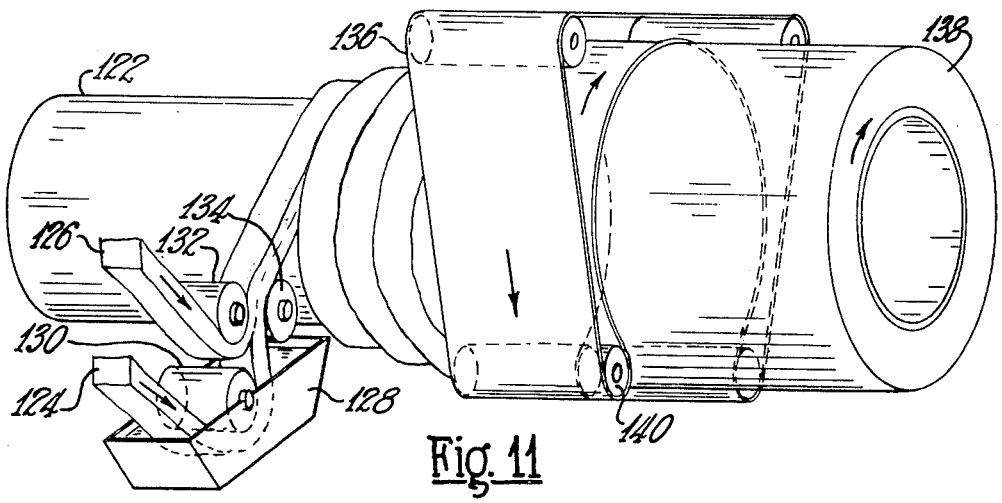
FIG. 11 is a schematic view in perspective of apparatus for producing a layer of insulating material on a pipe or tank, by way of example.

Insulation for pipe or a storage tank, by way of example, can be applied with the apparatus schematically shown in FIG. 11. In this instance, a pipe 122 can be rotated in the direction of the arrows and advanced toward the right. Two layers or strips 124 and 126 of fibers supplied from a suitable source (not shown) are spirally wrapped around the pipe 122 as the pipe is rotated and advanced. The lower fibrous layer 124 is directed into a receptacle 128 into which foamable material is supplied from a source (not shown), this material being similar to the material 30 of FIG. 1, for example. The lower layer 124 moves under a guide roll 130 so that the layer 124 is fully immersed in the foamable material, the supply of the foamable material being small so that the dwell time of the foamable material in the receptacle 128 is short. The two layers 124 and 126, the former now being impregnated with the foamable material, then pass between a pair of guide and squeeze rolls 132 and 134 which guides them onto the pipe 122 and compresses them somewhat so that some of the foamable material penetrates the outer or upper layer 126 to some degree. As foaming of the foamable material progresses, the layers or strips move beneath an endless compression belt 136 which restricts the foaming of the foamable material to some extent. The foamable material also penetrates the adjacent wraps of the strips so that a substantially integral final insulating layer 138 results on the pipe 122. The compression belt 136 is guided and wound around a plurality of rolls 140, one of which can be driven to enable the compression belt 136 to move with substantially the same peripheral speed as the outer surface of the insulation 138.

FIG. 12 schematically shows in perspective apparatus for applying compressive forces to the foam-fiber combination, this apparatus being used in place of the conveyor 62 and its related components. Whereas the conveyor 62 applies uniform and preferably slight compressive force to the foam-fiber layer, the apparatus of FIG. 12 applies the compressive forces in a non-uniform, concentrated manner in effect to knead the foam-fiber combination to achieve mixing thereof. The combination of the carrier sheet 12, the fibrous layer 16, the foamable liquid 30, the fibrous layer 48, and the upper sheet 52 are directed between the lower supporting roll 60 and an upper compressive roll 142. The compressive roll 142 actually consists of two or more individual rolls 144 which have projections or cleats 146 thereon to facilitate kneading and thorough mixing of the foamable material and the fibers of the fibrous layers. In a preferred form, the individual rolls 144 are rubber tires having treads thereon, with the tires being of a low-profile, low-pressure type. The rolls 144 are rotatably mounted on an axle 148 suspended by supports 150 which can be vertically adjusted. The projections of the rolls provide concentrated compressive forces on the combined foam-fiber layer, which causes thorough mixing and wet out of the fibers by the foamable material. The projections can also help spread the foam outwardly toward the edges of the fibrous layers. If desired, additional rolls or tires can be located downstream of the rolls 144 and positioned on a line between the rolls 144 to knead the foam-fiber combination tending to pass through any space or gaps between the rolls 144.

Referring to FIG. 13, additional modified apparatus for applying compressive forces to the foam-fiber combination is shown somewhat schematically. In this instance, four rolls 152 are shown, being rotatably supported on pivoted arms 154. The arms 154, in turn, are pivotally supported by four spokes 156 rotatably mounted on an axle 158. The arms 154 have setscrews 160 connected between them and the spokes 156 to limit movement of the arms and the rolls downwardly toward the foam-fiber layer. The spokes 156 are driven in a counterclockwise manner, as shown, by suitable means including a driven sprocket 162, a chain 164, a drive sprocket 166, and a motor 168. With this direction of rotation, the rolls 152 move in the same direction as the foam-fiber combination but at a faster speed.

The roll assembly and the drive are mounted on a platform 170 pivoted by an axle 172 to a framework 174. A pneumatic cylinder 176 connects a portion of the frame 174 to the platform 170. By varying the amount of pressure supplied to the rod end of the cylinder 176, and by adjusting the setscrews 160, the extent of the contact of the rolls 152 on the foam-fiber combination can be controlled. The rolls 152 preferably apply substantially uniform pressure over the foam-fiber layer as they move thereover, with the extent of the contacts of the rolls with the layer being such as to overlap somewhat.

The rolls 152 again provide somewhat concentrated forces on the foam-fiber combination, these forces being somewhat more uniform than those provided by the projections 146 of the rolls 144. However, the arrangement of the rolls 152 has an advantage over the conveyor 62 of FIG. 1. With the conveyor 62, it is possible for the foam applied between the fibrous layers to build up in front of the conveyor 62. If this is sufficient, the foam is delayed to the point that it begins to foam along the built-up line prior to its intended location. However, with the arrangement of the rolls 152, such build-up cannot occur in the foam-fiber layer and this potential problem is eliminated.

Various modifications of the above-described embodiments of the invention will be apparent to those skilled in the art, and it is to be understood that such modifications can be made without departing from the scope of the invention, if they are within the spirit and the tenor of the accompanying claims.

We claim:

1. Apparatus for producing a body of fiber-reinforced foam, said apparatus comprising means for supplying a layer of fibers along a horizontal path, means downstream of said fibers supplying means for supplying a foamable material substantially uniformly on the upper surface of said layer, means downstream of said foamable material supplying means for supplying a flexible sheet above said layer of fibers and said foamable material, means extending substantially across the width of said layer for compressing the layer through said flexible sheet to aid in penetration of the foamable material, and means downstream of said compressing means to subsequently restrict the extent of the rise of the foamable material during foaming, said compressing means comprising a plurality of rolls, means connected to said rolls for supporting said rolls transversely to the path of said layer with their axes parallel, and means connected to said rolls for rotating said rolls in a circular path with the rolls closest to said layer moving in the same direction as said layer.

2. Apparatus according to claim 1 characterized by means for supplying a second layer of fibers on the first layer with the foamable material therebetween, and said compressing means compresses both of said layers through said flexible sheet to aid in penetration of the foam into both of said layers.

3. Apparatus according to claim 2 characterized further by means for supplying a flexible sheet under the first fibrous layer.

4. Apparatus according to claim 1 characterized by said compressing means comprises a pair of conveyor belts having at least portions of adjacent runs spaced apart a distance less than the thickness of said fiber layer, with the adjacent runs of said conveyor belt being disposed in divergent relationship.

5. Apparatus for producing a body of fiber-reinforced foam comprising means for supplying a layer of fibers, means downstream of said fibers supplying means for supplying a foamable material substantially uniformly to one surface of said layer, means downstream of said foamable material supply means for applying compressive forces in a non-uniform, concentrated manner to the composite layer to knead the foamable material into the fibrous layer to cause the foamable material to penetrate into the fibrous layer, said compressive means comprising a plurality of rolls located above the composite layer, and means connected to said rolls for rotating the rolls in a circular path about a common axis to move the individual rolls sequentially into contact with the composite layer, and means downstream of said rolls for limiting the maximum distance the outer surfaces of the layer can be moved apart to restrict the extent of the foaming of the foamable material.

* * * * *